United States Patent
Chiou et al.

(10) Patent No.: US 7,180,019 B1
(45) Date of Patent: Feb. 20, 2007

(54) CAPACITIVE ACCELEROMETER OR ACCELERATION SWITCH

(75) Inventors: Jen-Huang A. Chiou, Libertyville, IL (US); Shiuh-Hui S. Chen, Lake Zurich, IL (US); Arthur J. Edwards, Palatine, IL (US)

(73) Assignee: Temic Automotive of North America, Inc., Deer Park, IL (US)

( * ) Notice: Subject to any disclaimer, the term of this patent is extended or adjusted under 35 U.S.C. 154(b) by 0 days.

(21) Appl. No.: 11/426,366

(22) Filed: Jun. 26, 2006

(51) Int. Cl.
*H01H 35/14* (2006.01)

(52) U.S. Cl. .................. 200/61.45 R; 200/61.48; 200/61.45 M; 73/514.32

(58) Field of Classification Search .......... 200/61.45 R–61.45 M; 73/514.01, 514.16, 514.29, 73/514.31, 514.32, 514.35, 514.36, 514.38
See application file for complete search history.

(56) References Cited

U.S. PATENT DOCUMENTS

| | | | |
|---|---|---|---|
| 5,545,912 A | | 8/1996 | Ristic |
| 5,567,880 A | * | 10/1996 | Yokota et al. ............ 73/514.33 |
| 5,591,910 A | * | 1/1997 | Lin ......................... 73/514.38 |
| 5,616,844 A | * | 4/1997 | Suzuki et al. ............ 73/514.32 |
| 6,018,998 A | * | 2/2000 | Zunino et al. ............ 73/514.16 |
| 6,072,247 A | * | 6/2000 | Lammert et al. .......... 307/10.1 |
| 6,074,890 A | | 6/2000 | Yao |
| 6,293,149 B1 | * | 9/2001 | Yoshida et al. ........... 73/514.01 |
| 6,845,670 B1 | * | 1/2005 | McNeil et al. ............ 73/514.32 |
| 6,854,330 B2 | * | 2/2005 | Potter ....................... 73/514.25 |
| 6,955,086 B2 | * | 10/2005 | Yoshikawa et al. ....... 73/514.32 |
| 6,984,541 B2 | | 1/2006 | Sakai |
| 7,004,029 B2 | * | 2/2006 | Sakai ....................... 73/514.32 |
| 7,009,124 B2 | | 3/2006 | Chen |
| 7,024,933 B2 | * | 4/2006 | Malametz ................. 73/514.32 |
| 7,059,190 B2 | * | 6/2006 | Sakai et al. .............. 73/514.32 |

* cited by examiner

*Primary Examiner*—Michael A. Friedhofer
(74) *Attorney, Agent, or Firm*—Terri S. Hughes; Gary J. Cunningham

(57) ABSTRACT

An accelerometer or accelerator switch and its method of manufacture are disclosed. The device is fabricated from two substrates: a top substrate having a moveable mass, and a bottom substrate having at least one conductive plate. The top substrate is preferably a SOI substrate, and the mass and its suspending beams are formed in the silicon layer under which the insulator layer has been removed. The bottom substrate is preferably oxide. In one embodiment, the capacitance is formed using the mass as the first capacitor plate the conductive plate as the second plate. As the mass moves, the capacitance is detected to indicate the magnitude of the acceleration, or whether acceleration is above or below a threshold indicting an open or closed switch. The beams which suspend the mass can be serpentines, which make the device compact and render the mass more flexible. Alternatively, the bottom conductive plate can be split into two plates each coupling to the mass. Depending on the capacitance between the two split plates, this configuration allows for the formation of either a normally-open or normally-close acceleration switch.

18 Claims, 14 Drawing Sheets

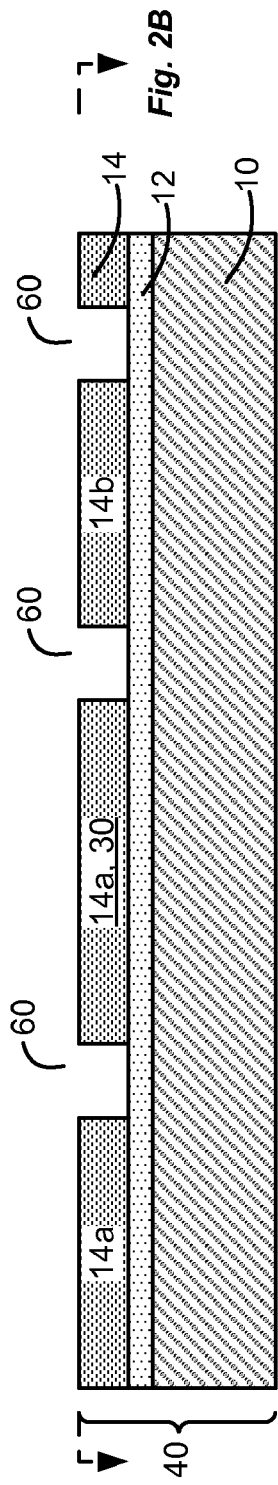
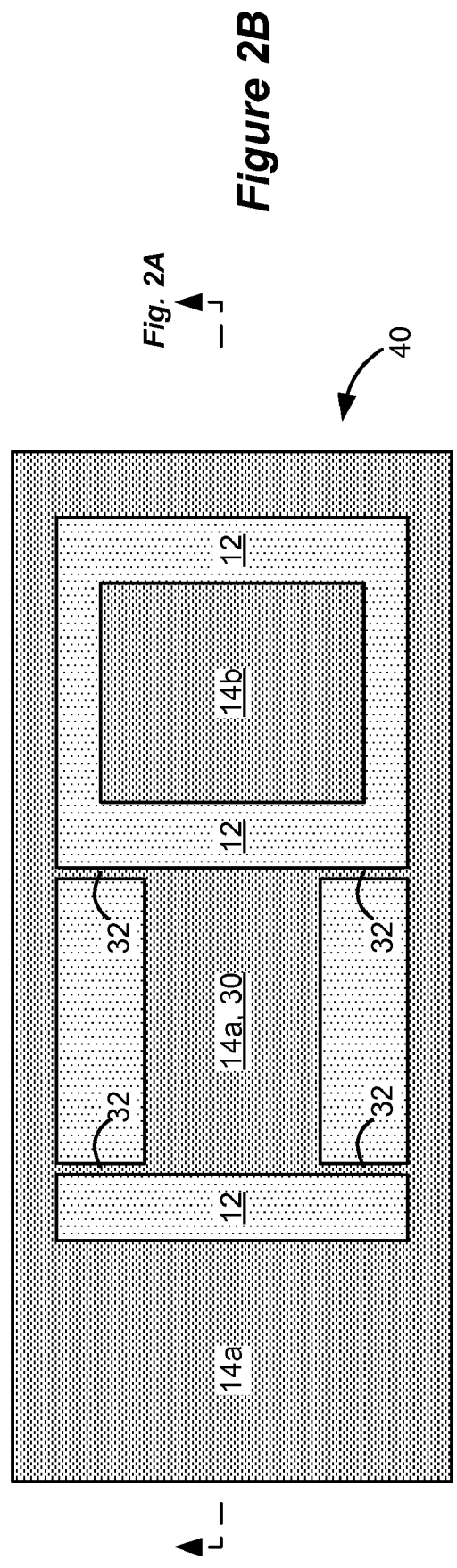

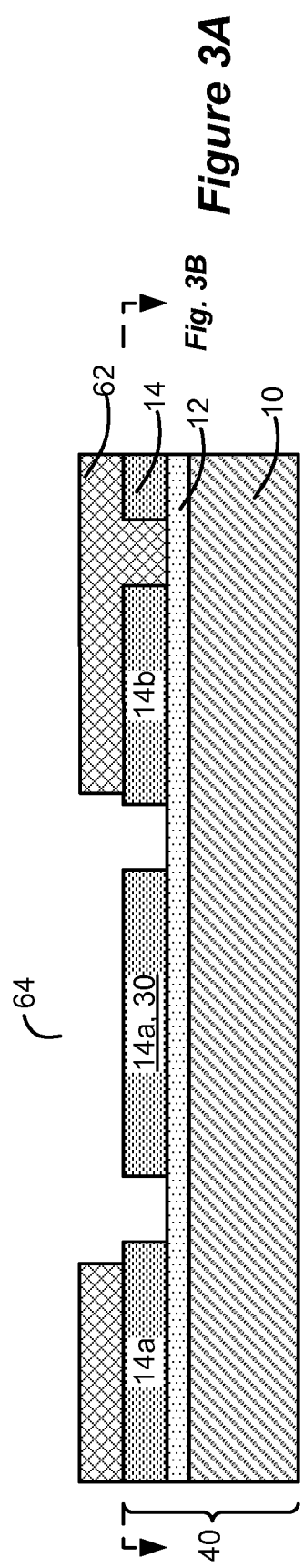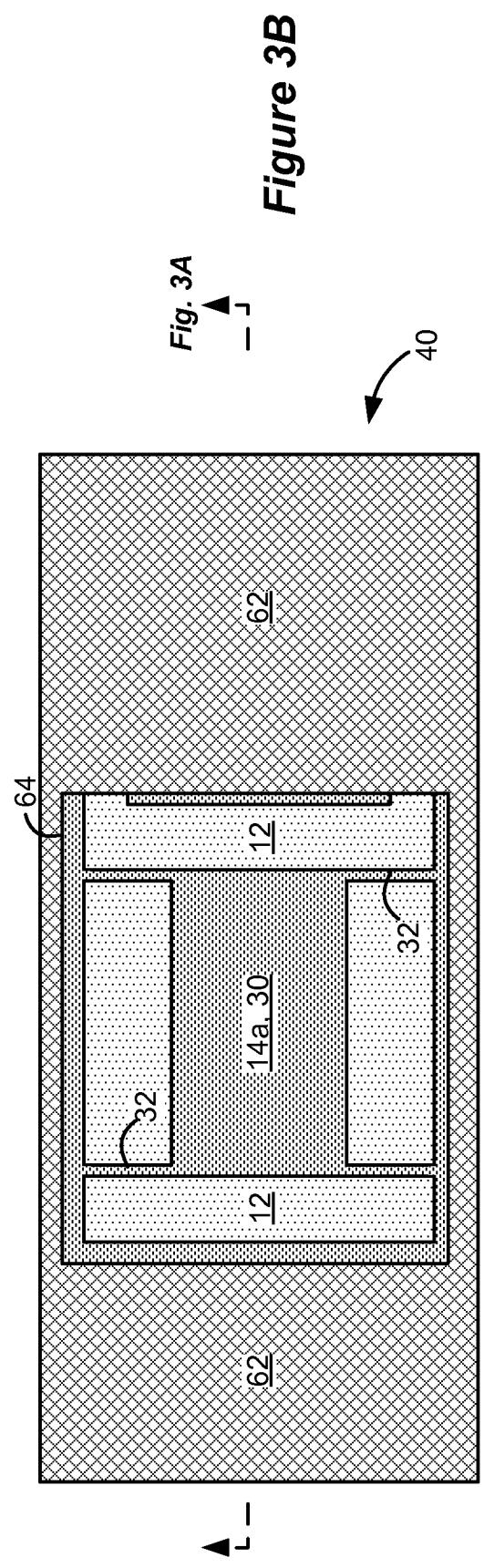

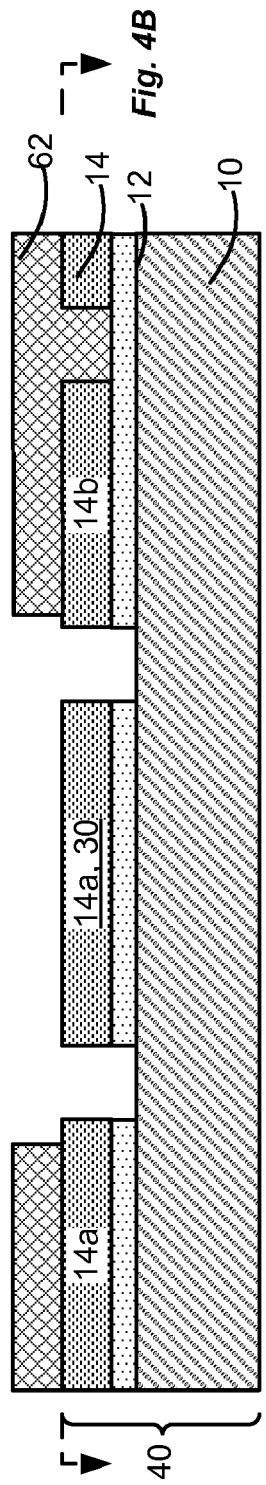
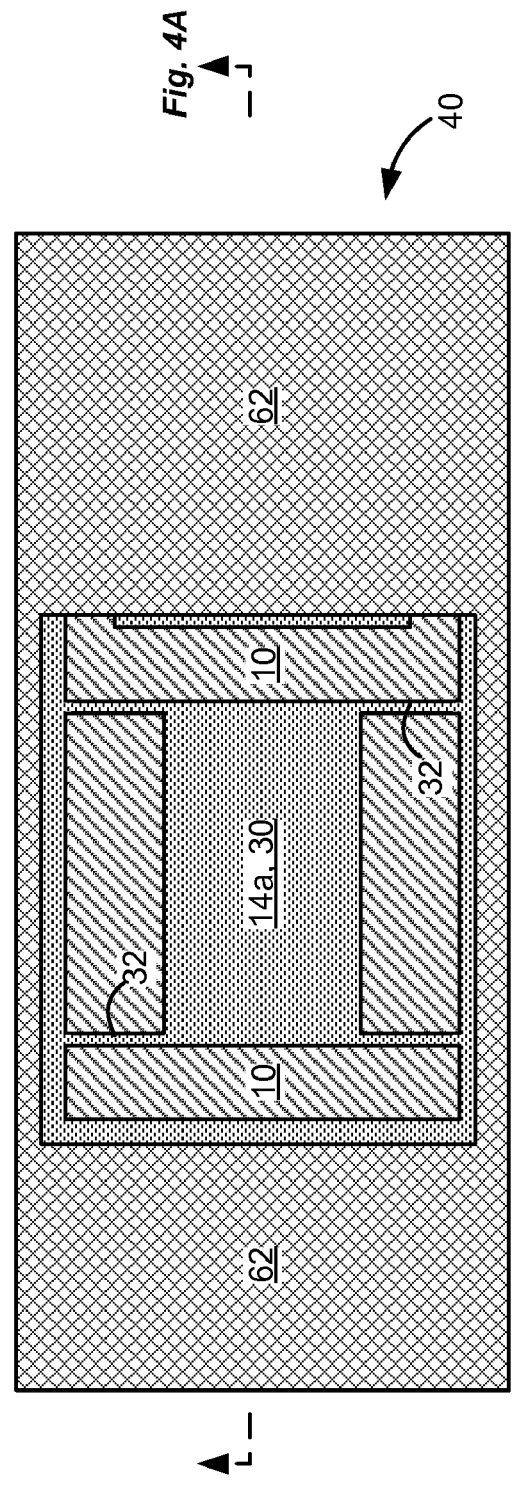
Figure 4A
Figure 4B

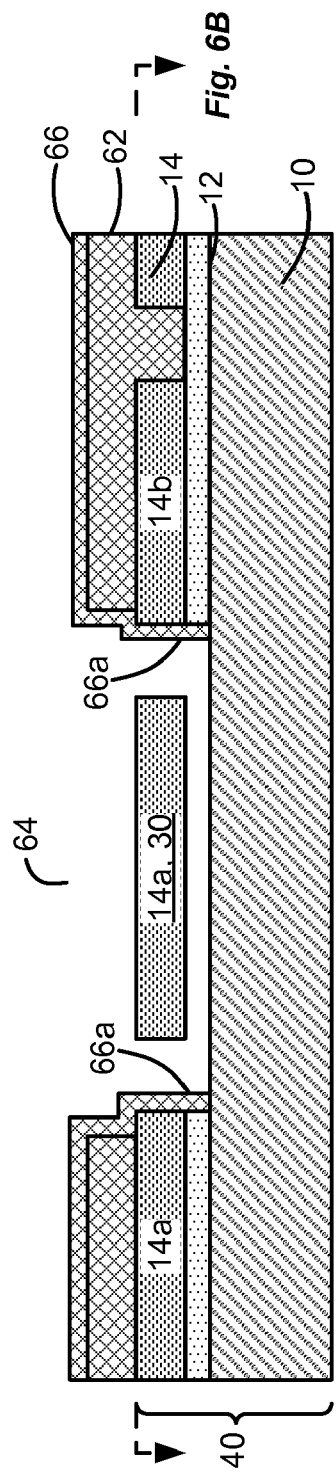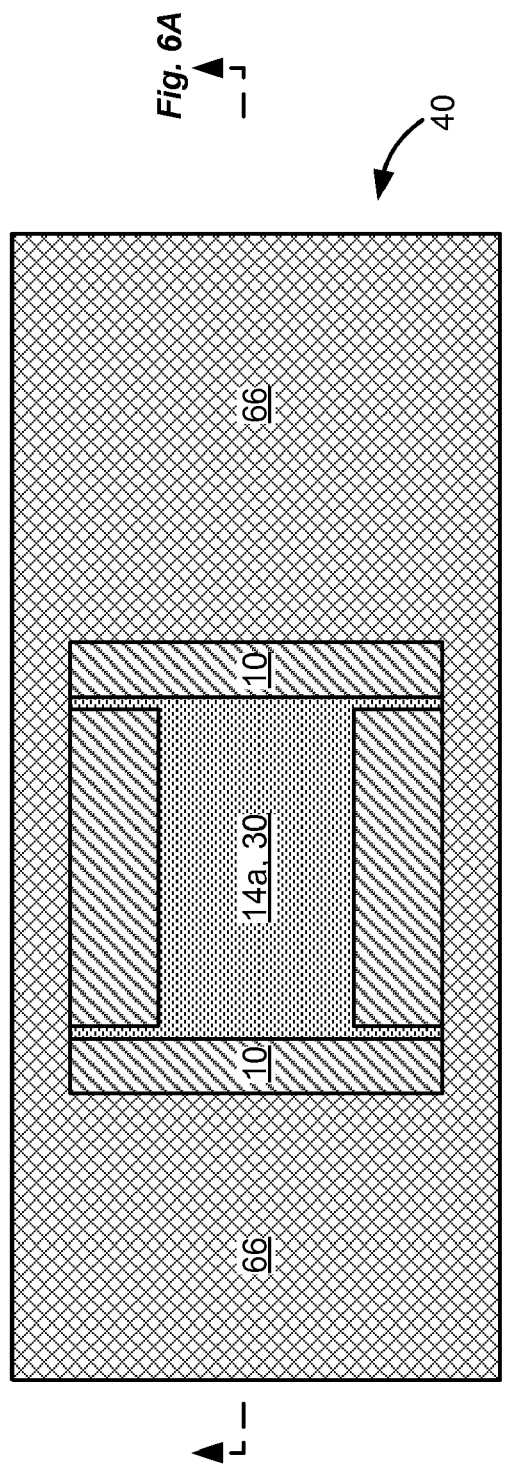
*Figure 6A*
*Figure 6B*

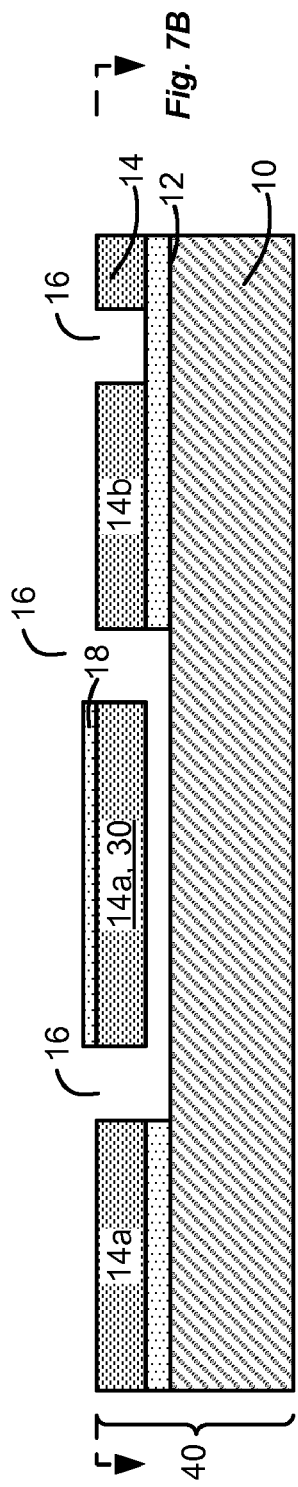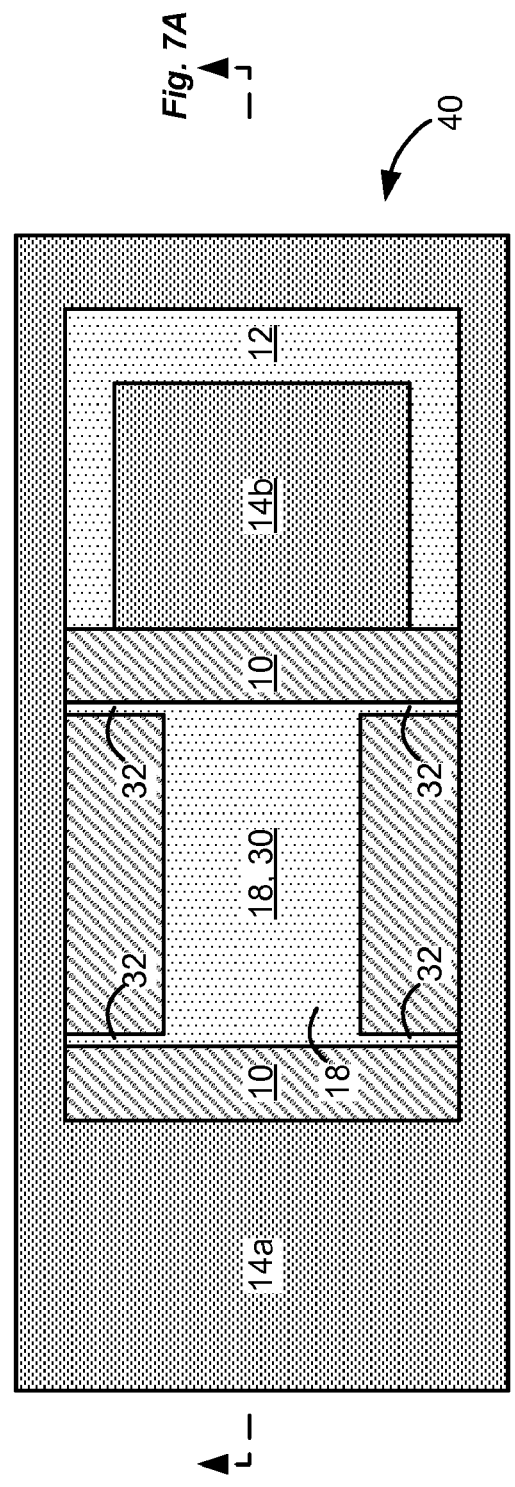

CAPACITIVE ACCELEROMETER OR ACCELERATION SWITCH

FIELD OF THE INVENTION

This invention generally relates to a capacitive acceleration switch or a capacitive accelerometer, particularly useful in, but not limited to, a tire pressure sensor.

BACKGROUND

There are many applications in which it is desired to measure acceleration, and devices for measuring acceleration are referred to as accelerometers. Because accelerometers are often used in conjunction with integrated circuitry, it is sensible to manufacture accelerometers in manners consistent with integrated circuitry fabrication techniques. Accordingly, many accelerometer designs have been disclosed in the art, and which are basically fabricated as microelectromechanical systems (MEMS) using essentially standard semiconductor manufacturing techniques, such as those based on silicon substrates.

In an accelerometer, a moveable mass is fabricated, and although the mass should be significant, it is in actuality quite small given the semiconductor processing techniques that are used to form it. The mass is sensitive to acceleration, such that an acceleration places a force on the mass (i.e., F=ma). The force generally causes the mass to move, and this movement is somehow electronically detected. For instance, the mass might define a first plate of a capacitor and its movement may vary the spacing between that first plate and a fixed second capacitor plate. A change in plate spacing scales with the inverse of capacitance, as is well known. Thus, as the mass moves, the capacitance of the capacitor will change, and this change in capacitance can be detected and correlated to the acceleration.

While an accelerometer measures the absolute value of the acceleration, an acceleration switch either turns on or off depending on the amount of acceleration that is present. Such acceleration switches are generally designed to have an acceleration threshold that determines the tripping point of the switch. For example, if the acceleration is less than 30 Gs, the switch will be open and will not conduct current; if greater than 30 Gs, the switch will be closed and will conduct a current. In any event, such acceleration switches are generally built using the same principles as are accelerometers. Continuing the example above, if the mass is designed to move such that the first plate touches the fixed second plate at an acceleration of 30 G, then a switch as just described is fabricated. In these examples, the only differences between the accelerometer and the acceleration switch are whether their plates touch during a useful operating range and the detection circuitry to be used (capacitance v. current). Other examples of accelerometers of acceleration switches can be found in the following references, all of which are hereby incorporated by reference in their entireties: U.S. Pat. Nos. 5,545,912; 6,074,890; 7,009,124; and 6,984,541.

One application in which an accelerometer switch is useful is in a wireless tire pressure sensor. Because wireless tire pressure sensors are known, they are not discussed in great detail, and instead the reader is referred to the following U.S. patent applications, which are hereby incorporated by reference in their entireties: U.S. Ser. No. 11/144,549 filed on Jun. 3, 2005 and U.S. Ser. No. 11/144,992 both filed on Jun. 3, 2005. Briefly, such tire pressure sensors generally are insertable into a tire rim's valve stem and include an electronic pressure sensor for measuring the tire pressure, a radio frequency (RF) transmitter, and a power source such as a battery. The tire pressure is read by the sensor and the resulting pressure data is sent to a RF transmitter for transmission to the vehicle's computer, which in turn provides a proper indication of tire pressure to the driver (e.g., such as by illuminating a low tire indicator on the vehicle's dashboard).

An acceleration switch can be used in the context of a wireless tire pressure sensor to conserve battery power. In this regard, it is desirable to more frequently transmit tire pressure data from the sensor to the vehicle's computer at higher vehicle speeds than at lower speeds. Thus, it might be preferred to transmit tire pressure data more frequently, perhaps every 30 seconds, when the car is traveling faster than 25 mph. However, it might only be necessary to transmit tire pressure data quite infrequently when the car is traveling slower than 25 mph or not moving at all; in such cases, transmitting at the faster rate would be wasteful of battery power. Accordingly, the accelerometer switch can be tuned to trip at 25 mph. (Note that the centripetal acceleration detected by the acceleration switch scales with the square of the rotational speed divided by the radius from the center of the wheel). Therefore, the acceleration switch can be used to control the tire pressure data transmission rate, saving battery life.

While both accelerometers and accelerator switches are useful, previous designs have been complicated to manufacture, or suffer from reliability concerns. For example, in accelerations switches, which rely on an electrode on the moving mass making contact with another electrode to establish a current, the mechanical action at the electrodes can cause them to degrade. Or, the passage of current through the electrodes may cause localized resistive heating which cause the electrodes to weld together. This means currents lower than optimal might have to be used. In short, an improved accelerometer or acceleration switch design that is reliable and cheaper to produce would be of benefit to the art of tire pressure sensors, and any other arts in which such devices could be used.

BRIEF DESCRIPTION OF THE DRAWINGS

Embodiments of the inventive aspects of this disclosure will be best understood with reference to the following detailed description, when read in conjunction with the accompanying drawings, in which:

FIGS. 2A and 2B through 7A and 7B illustrate steps in the formation of the top substrate in accordance with embodiments of the invention, which includes formation of the moveable mass and its support beams;

FIGS. 8A and 8B through 10A and 10B illustrate steps in the formation of the bottom substrate in accordance with embodiments of the invention, which includes formation of the bottom capacitor plate;

DETAILED DESCRIPTION

An improved accelerometer or accelerator switch ("device") and its method of manufacture are disclosed. The device is fabricated from two substrates which are sandwiched together to complete the device: a top substrate having a moveable mass, and a bottom substrate having at least one conductive plate. The top substrate preferably starts as a Silicon-On-Insulator (SOI) substrate, and the mass and its suspending beams are formed in the silicon layer under which the insulator layer has been removed. The bottom substrate preferably starts as an oxide substrate. In one embodiment, the capacitance is formed using the mass as the first capacitor plate and the conductive plate as the second plate. As the mass moves, the spacing between the plates changes inversely with the capacitance, which is then detected to indicate the magnitude of the acceleration, or whether acceleration is above or below a threshold indicting an open or closed switch. In an embodiment, the beams which suspend the mass are serpentines, which make the device more compact and render the mass more flexible. In another embodiment, the bottom conductive plate can be split into two plates each coupling to the mass. Depending on the capacitance between the two split plates, this configuration allows for the formation of either a normally-open or normally-close acceleration switch. Through proper processing and alignment of the two substrates, the two can be affixed together by anodic bonding with the result that proper electrical connections are made between the two substrates without the need for further wiring.

Figure 1A:
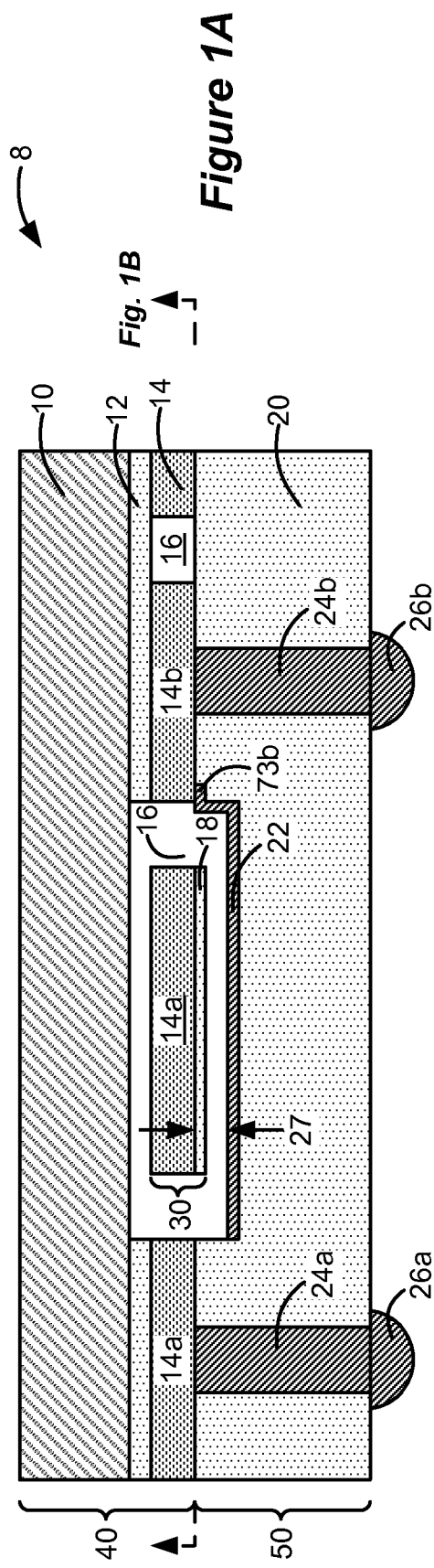
FIGS. 1A and 1B illustrates respectively in cross section and from a plan view an embodiment of the improved accelerometer or accelerator switch, and shows the top and bottom substrates which are sandwiched to form the device.

The improved accelerometer or accelerator switch 8 is shown in cross section in FIG. 1A. The improved device 8 is formed of two processed substrates, top substrate 40 and bottom substrate 50, which are then sandwiched together to form the device 8 as will be explained in detail later. Before explaining the process of manufacture, however, basic operation of the device 8 is discussed.

Figure 1B:
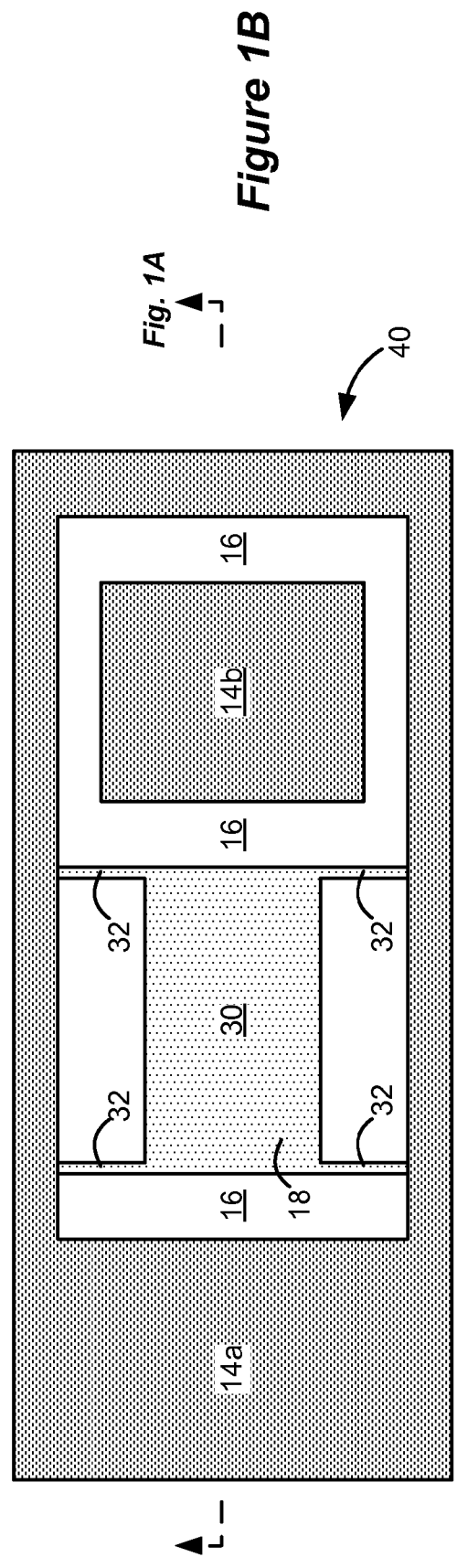

As shown, the improved accelerometer or accelerator switch 8 comprises a mass 30. This mass is suspended in a vacuum 16 by four beams 32, although a differing number of beams could be used as well. This configuration allows the mass 30, when accelerated, to move up and down as shown from the vantage point of FIG. 1A, what can be described as an "out of plane" motion because it is orthogonal to the master plane of the device 8. Such out of plane movement of the mass changes the spacing 27 between the mass 30 (which can be thought of as a first capacitor plate) and conductive plate 22. Note that the mass 30 is largely composed of a conductive P+ crystalline layer of silicon 14, as will be described in further detail later. This conductive P+ layer 14 allows for contact to the plates of the capacitor: solder bump 26a couples to the mass 30 through 14a, which is continuous through the beams 32; solder bump 26b couples to plate 22 through layer 14b, which in the top down view of FIG. 1B, is isolated from P+ conductive layer 14a. Accordingly, by sensing the capacitance at solder bumps 26a and 26b, or assessing the ability of an AC signal to pass from one bump to another, the amount of spacing between the mass 30 and the plate 22 can be inferred, and correlated to a particular acceleration.

With this basic introduction of the operation of the improved accelerometer or accelerator switch 8 in hand, attention is now turned to the process for making the device 8.

As noted above, the device 8 is formed of two processed substrates 40 and 50, which are then sandwiched together to complete fabrication of the device 8. Accordingly, to explain the device's manufacture, it is easiest to first explain how top substrate 40 is processed (FIGS. 2–7), and then the processing of bottom substrate 50 will be discussed (FIGS. 8–10). One skilled in the art of semiconductor or microprocessing will understand that the processes disclosed are simply one way of constructing the improved accelerometer or accelerator switch 8. Moreover, because the processes illustrated are well known to those of skill in the art, specific details such as etchants, etch rates, etc. have been omitted for clarity. The processes disclosed should be understood as merely illustrative and not as limiting the scope of the invention.

Fabrication of top substrate 40 begins with FIGS. 2A and 2B which, like subsequent figures, respectively show substrate 40 in cross-sectional and top-down views. In one embodiment, substrate 40, prior to processing, comprises a SOI substrate. Hence, the substrate 40 comprises at its beginning a crystalline silicon layer 10, a buried oxide (dielectric) layer 12, and a P-doped crystalline silicon layer 14. Such starting SOI substrates are well known in the art of semiconductor manufacturing, and hence are not further discussed. If the starting SOI substrate only has a lightly P doped layer 14, diffusion or ion implantation can be performed on layer 14 to render it heavily P doped, as is known.

The starting SOI substrate is masked and etched to form trenches 60, which as best shown in FIG. 2B, essentially define the mass 30, the beams 32, the P+ layer 14a coupled to the mass 30, and the P+ layer 14b which will ultimately be coupled to layer 22 and solder bump 26b on the other substrate 50 (not shown). Such masking and etching steps are industry standard, and thus are not further discussed.

Next, as shown in FIGS. 3A and 3B, the resulting structure is coated with a suitable masking material 62 such as silicon nitride, and is patterned and etched to form an opening 64 essentially over only the mass 30 and the beams 32. This is a first step in producing a mass 30 and beams 32 that are floating or suspended, as will be seen shortly. Notice that layer 14b is mostly or entirely protected by the mask 62.

Next, as shown in FIGS. 4A and 4B, the resulting structure is subject to an anisotropic etch to remove exposed portions of buried oxide layer 12, and to in turn expose underlying portion of the crystalline silicon layer 10. Again, etching oxide in a manner selective to silicon nitride and crystalline silicon is well known in the industry.

Figure 5A:
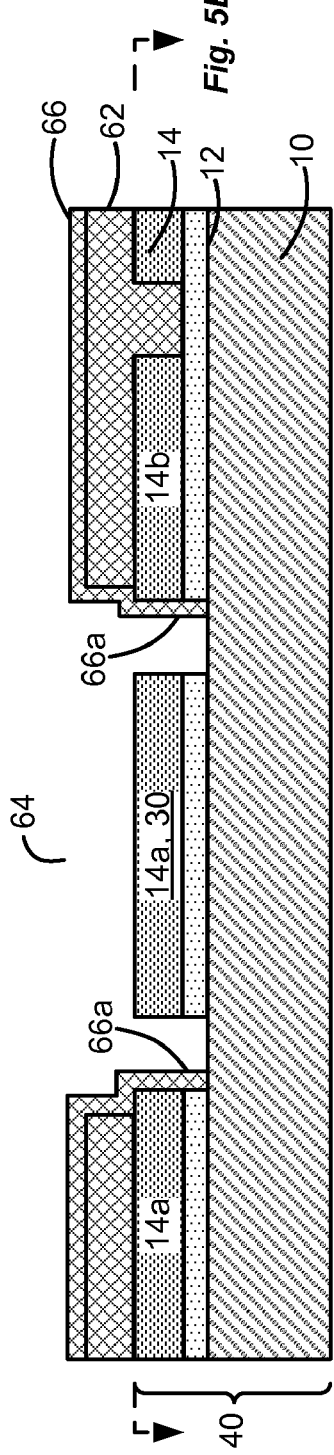
Figure 5B:
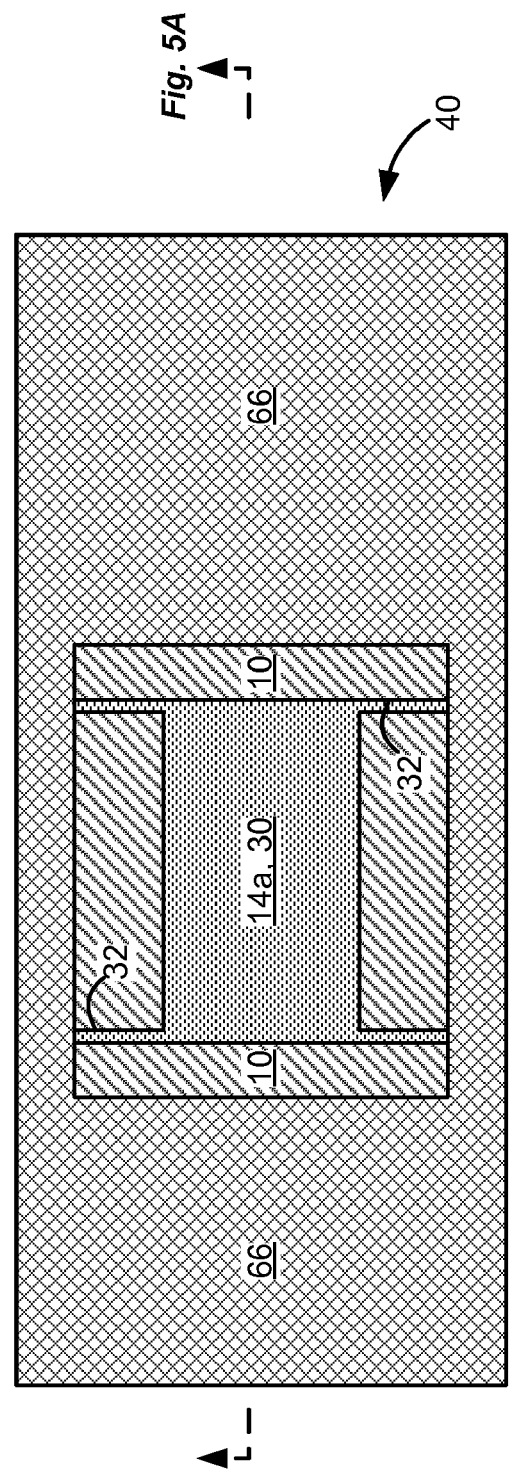

Next, as shown in FIGS. 5A and 5B, another masking material 66 is deposited, and this masking material may be the same material used for masking material 62 (e.g., silicon nitride). In one embodiment, the mask 66 is the same as, but slightly smaller than, the mask 62 of FIGS. 3A and 3B. The result of such sizing is that a sidewall 66a of masking materials 66 is left on the outer edges of the opening 64. Most importantly, these sidewalls 66a cover the outer edges of buried oxide layer 12, which is useful to protect that layer during the next processing step.

Next, and as shown in FIGS. 6A and 6B, the buried oxide layer 12 is removed from under the mass 30 and the beams 32. To accomplish this, the oxide 12 under the mass 30 and beams 32 must be undercut, and therefore an isotropic oxide etch is used for this purpose. For example, a vaporized dry hydrofluoric acid (HF) etch can be used for the undercutting etch. Alternatively, a wet HF could also be used. Many such etches for undercutting oxides exist in the art, and any would be suitably employed at the step illustrated in FIGS. 6A and 6B. During this etch, the sidewalls 66a protect the oxide 12 in locations not underlying the mass 30 or beams 32.

At this point, the mass 30 and the beams 32 are completely undercut, and thus the mass 30 is effectively suspended from the remainder of the substrate 40 by the beams 32. The remaining processing steps for substrate 40 are shown in FIGS. 7A and 7B, which basically involve removal of the masking materials 62 and 66. Optionally, prior to the removal of the masking material, the resulting structure can be subject to an oxide deposition or growth to form a thin oxide (dielectric) layer 18 on top of the mass 30. As will be seen subsequently, this oxide 18 on the mass 30 is beneficial because it precludes the possibility that the mass 30 could become shorted to the plate 22 (see FIG. 1A). This oxide 18 is very thin (e.g., a few hundred angstroms) and hence is shown as much larger in the Figures than is appropriate. Moreover, depending on the deposition or growth process used, oxide 18 may also be formed on other surfaces of the substrate 40. However, this is not shown as such oxides are very thin and are inconsequential in other location of the device 8. This completes the processing of the top substrate 40.

Figure 8A:
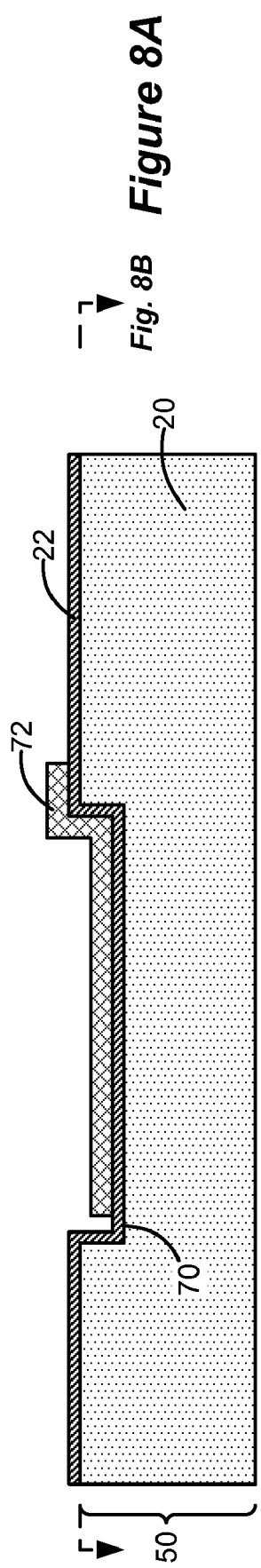
Figure 8B:
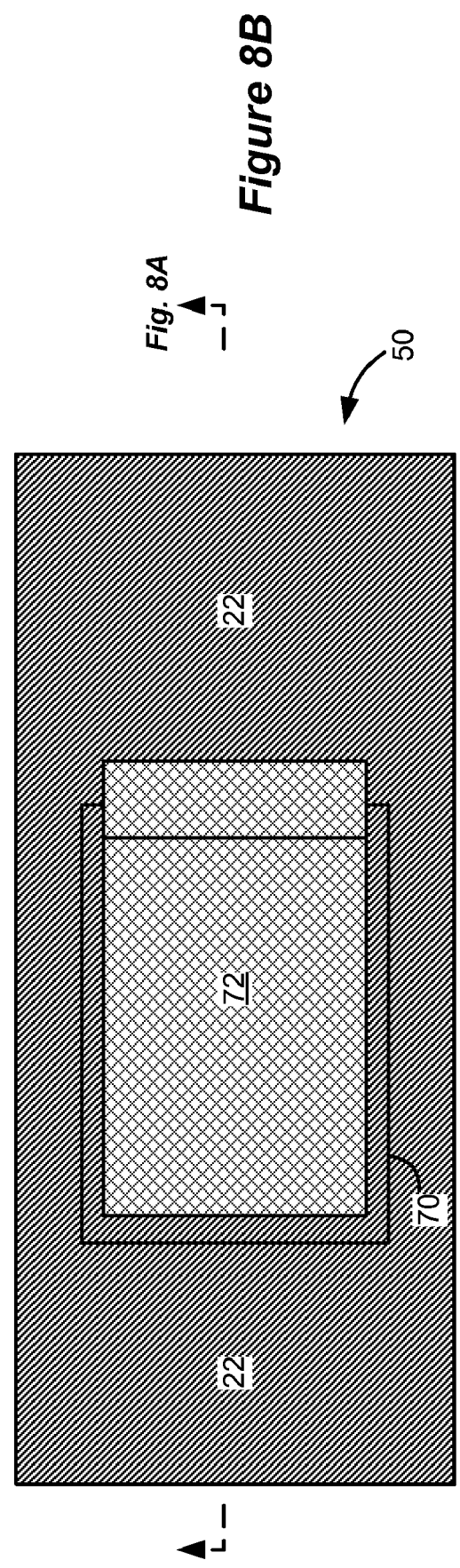

The processing of bottom substrate 50 is shown in FIGS. 8–10. Starting with FIGS. 8A and 8B, the starting material of substrate 50 is preferably a glass (dielectric) substrate 20. Such glass substrates are well-known in the semiconductor industry. As a first step, a recess 70 is etched into the surface of the glass substrate 20, essentially in a location that will correspond to the mass 30 and the beams 32 once the device 8 is completed.

Figure 9A:
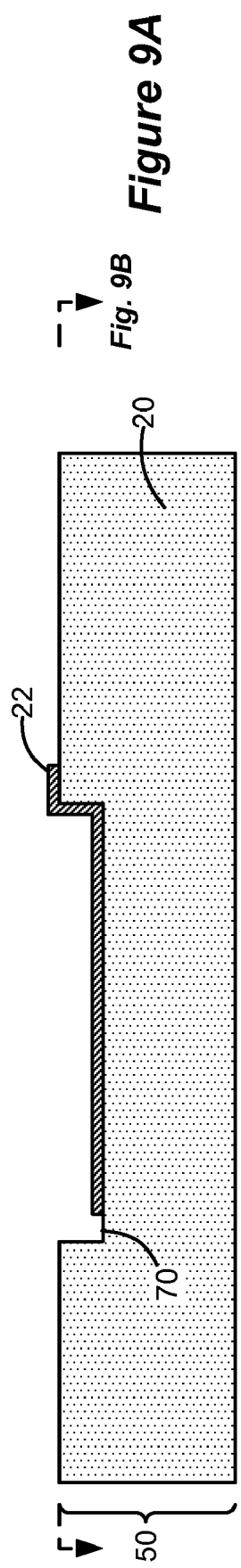
Figure 9B:
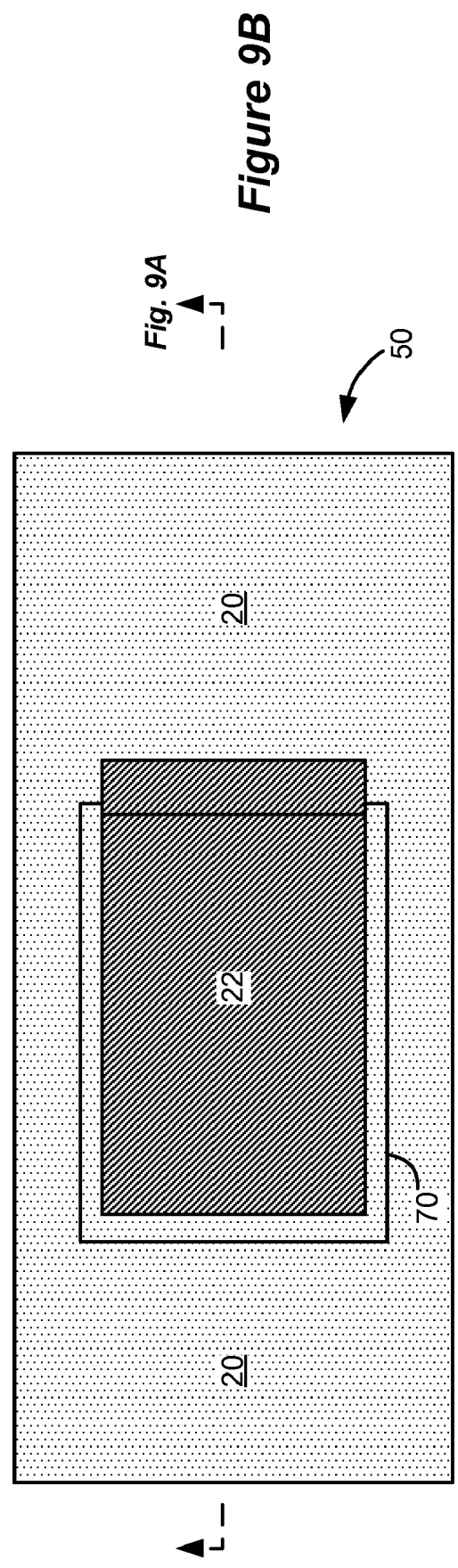

Thereafter, a conductive material 22 is deposited for the plate 22, i.e., the second capacitor plate (with the conductive P+ mass 30 comprising the first plate). In an embodiment, the plate material 22 can comprise gold, and would be quite a bit thinner (a few hundred angstroms) then the Figures would indicate, as one skilled in the art will understand. This plate layer 22 is masked using a mask layer 72, such as a photoresist or a hard mask such as silicon nitride (FIGS. 8A and 8B), and the exposed plate layer 22 is then etched and the mask layer 72 removed (FIGS. 9A and 9B). Other processes such as photoresist lift-off with multi-layer metals with gold and adhesive metal on the glass substrate 20 are also feasible and well-known in the semiconductor industry. It is important in this embodiment that the plate layer 22 be left short of the recess 70 at one end (73a) and overlap beyond the edge of the recess at the other end (73b). By so aligning the plate layer 22, and as will become clearer in subsequent Figures, it is assured upon sandwiching of the two substrates 40 and 50 that the plate layer 22 will not short to the first solder bump 26a (through P+ layer 14a), and instead will be shorted to solder bump 26b (through overlap 73a and P+ layer 14b).

Figure 10A:
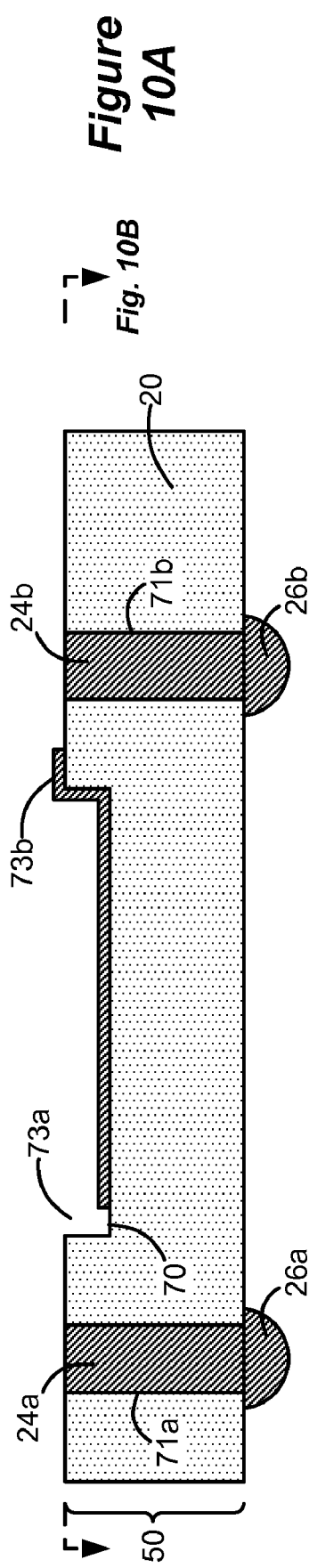
Figure 10B:
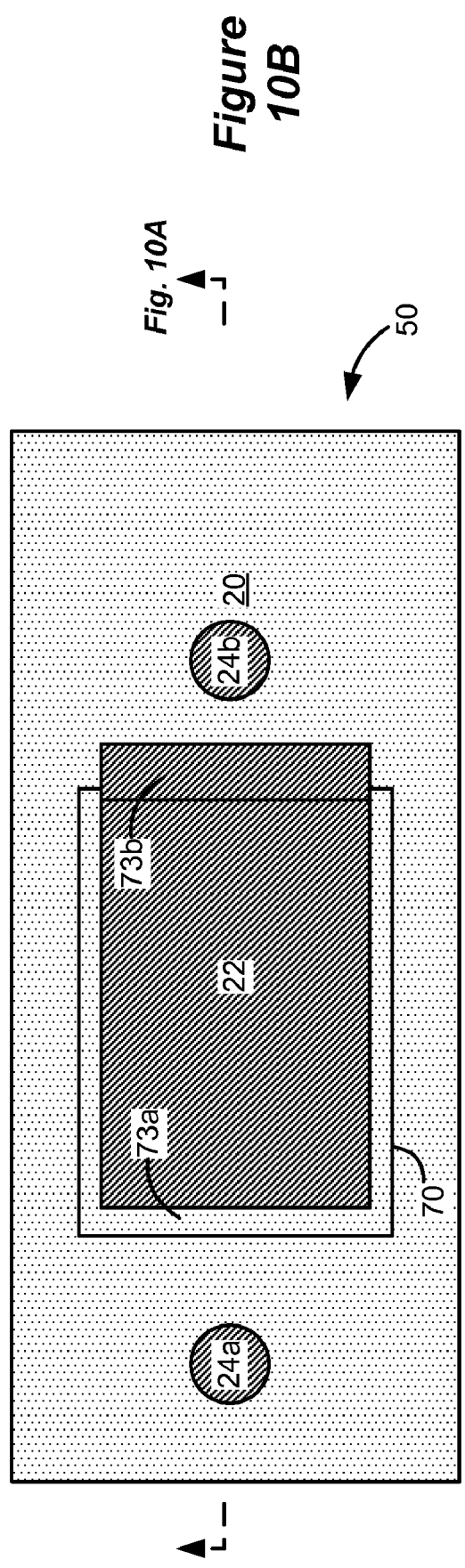

Next, as shown in FIGS. 10A and 10B, contacts for the capacitor are formed. First, holes 71a and 71b are milled through the glass substrate 20. These holes can be masked and anisotropically etched, can be drilled, or can be formed by a laser, all of which comprise standard techniques. Thereafter, the holes 71a and 71b are filled with plugs 24a and 24b, preferably formed of gold. Finally, solder bumps 26a and 26b are formed at the terminating ends of the plugs 24a and 24b to provide terminals for externally accessing the device 8. The use of solder bumps 26a and 26b allows the finished device 8 to be solder mounted to a printed circuit board comprising part of the tire pressure sensor, for example. However, other types of terminals or packaging could be used as well. At this point, processing of the bottom substrate 50 is complete.

Once both of the substrates 40 and 50 are complete as illustrated above, the final step in assembly of the improved accelerometer or acceleration switch 8 is to sandwich the two substrates together, such as is shown in FIG. 1A. Because the surfaces of the substrates are very flat, they can easily be anodically bonded together. Because anodic bonding is well known in the art, it is not further discussed. It should be noted that anodic boding is preferably performed at low pressure to create a vacuum 16 in the open spaces within the device.

Once the two substrates 40 and 50 are sandwiched, the operation of the device 8 can be better appreciated. As noted earlier, the two terminals 26a and 26b, each of which are external to the device 8, each couple to a plate of a capacitor: terminal 26a couples through plug 24a to P+ layer 14a, which couples to the mass 30 through the beams 32 (which are both composed of the P+ layer 14a); terminal 26b couples through plug 24b to P+ layer 14b (which is isolated by vacuum 16 from P+ layer 14a), which in turn couples to the plate 22 by the overlap 73b. Therefore, the capacitance of the capacitor formed by the mass 30 and the plate 22 can be monitored to determine the extent of any accelerative forces orthogonal to the plane of the device 8, which modifies the spacing 27 within the capacitor. Also, as noted earlier, because acceleration scales with wheel (vehicle) speed in a tire pressure sensor application, this device may also be able to detect vehicle speed, which can assist in preserving battery life in the sensor as discussed earlier.

Therefore, it should be appreciated that the resulting improved accelerometer or acceleration switch 8 is inexpensive to manufacture, as it relies on standard semiconductor processing techniques and standard processing materials and etchants. Moreover, the device can be batch processed, such that several devices can be formed on one substrate, again as one skilled in the art will appreciate. Moreover, the design is simple and reliable. For example, the device 8 does not work on a principle that the moving mass 30 must touch the plate 22 to complete a circuit path; in other words, the device does not rely on mechanical touching of these components to form a conductive path to operate, which renders them more reliable and not susceptible to heat-induced welding. Indeed, oxide 18 can be provided to the bottom of the mass specifically to prevent such shorting of the plates.

Figure 12:
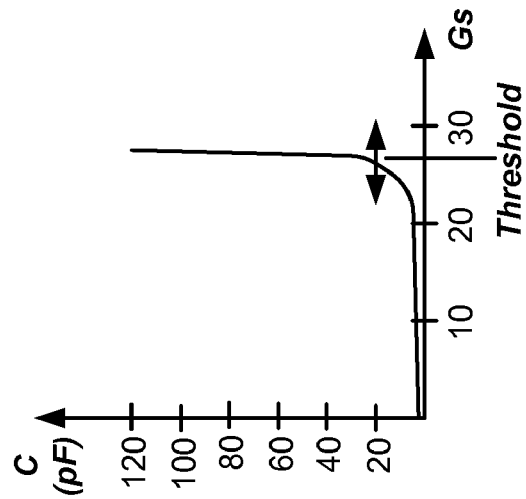
FIG. 12 shows an operational curve for the embodiment of FIG. 11 which shows capacitance versus acceleration for the device.
Figure 11:
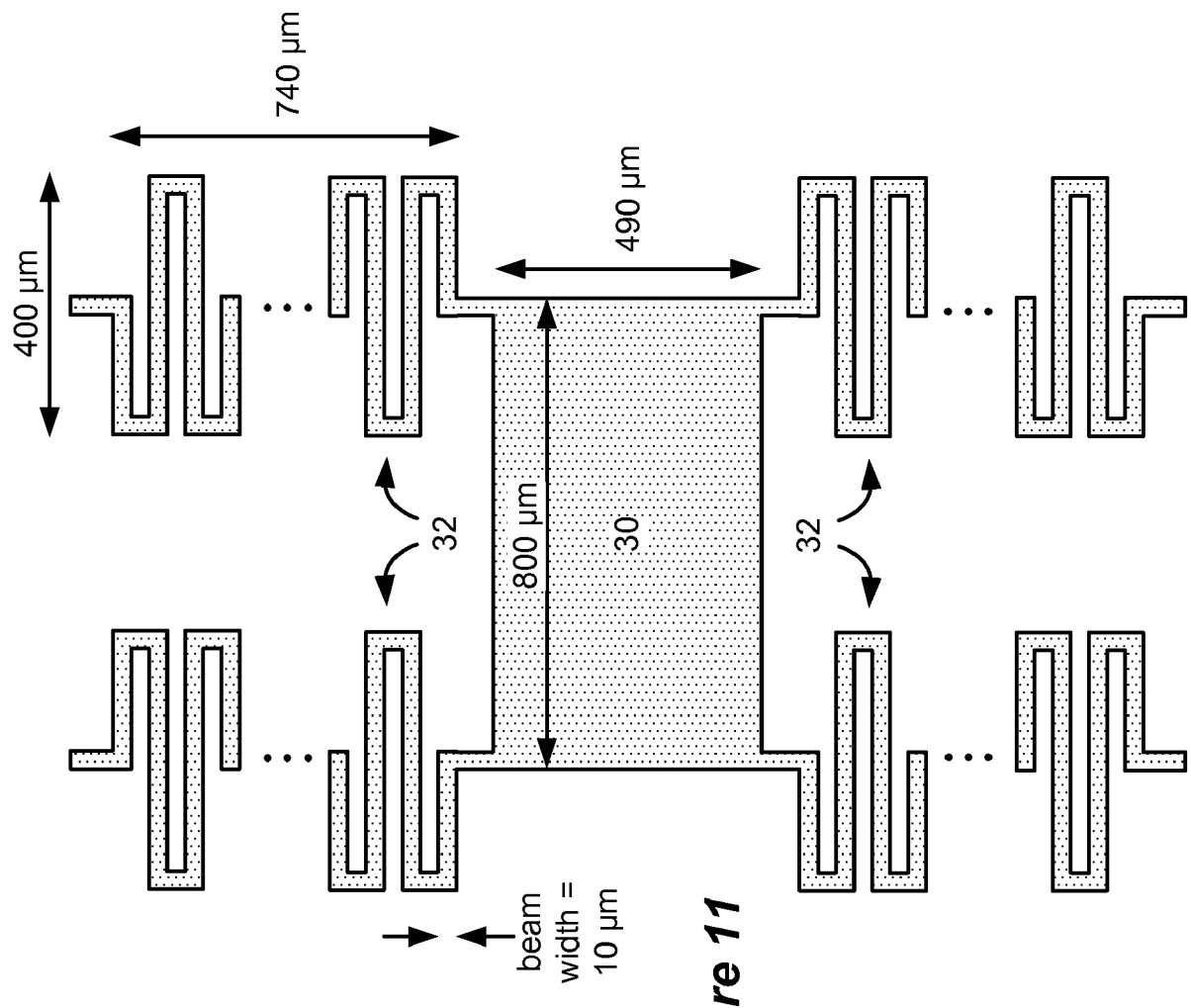
FIG. 11 shows an alternative embodiment in which the beams for the mass are formed in a serpentine to render the device more compact and to improve the flexibility of the mass.

Modifications to the above design are possible, and some modifications are illustrated in FIGS. 11–15. For example, in FIG. 11, it is seen that the beams 32 that suspend the mass 30 can be made in configurations other than straight lines. As shown, the beams 32 are serpentine in nature. By forming the beams 32 in a serpentine shape, several benefits result. First, the device 8 can be made in a more compact shape. Simulations show that the device as illustrated in FIG. 11 (having a beam length of approximately 740 microns) will have the same degree of flexibility as a device having straight beams 32 which are much longer (approximately 1530 microns). As well as being more compact, this further illustrates that serpentines can be used to tailor the flexibility of the beams 32, i.e., how much the spacing 27 of the mass 30 will change as a function of acceleration. This is shown by a review of the operational curve for the device 8 as shown in FIG. 12. As can be seen, higher G-forces bring the mass 30 closer to the plate 22, which causes the capacitance to increase. As is particularly useful in the context of an acceleration switch, the sharp increase in capacitance that the operational curve illustrates can be quantified as a threshold, i.e., a G-force at which the switch is deemed to be "on" or "off." This threshold may indicate that the mass 30 has actually touched plate 22, although the plates will not short to each other because dielectric layer 18 intervenes. Alternatively, the threshold may be deemed as some particular capacitance value which otherwise adequately discriminates between the "on" and "off" positions of the switch, even if the plates are not in contact at the threshold. Either way, this threshold can be modified by modifying the flexibility of the beams 32: the more flexible the beams 32, the larger the displacement of the mass for a given G-force, the higher the capacitance, and hence the lower the threshold. In short, the modification of FIG. 11 provides the ability to tune or tailor the operation of the accelerator switch, or the sensitivity of the accelerometer, by changing the beam flexibility.

Figure 13A:
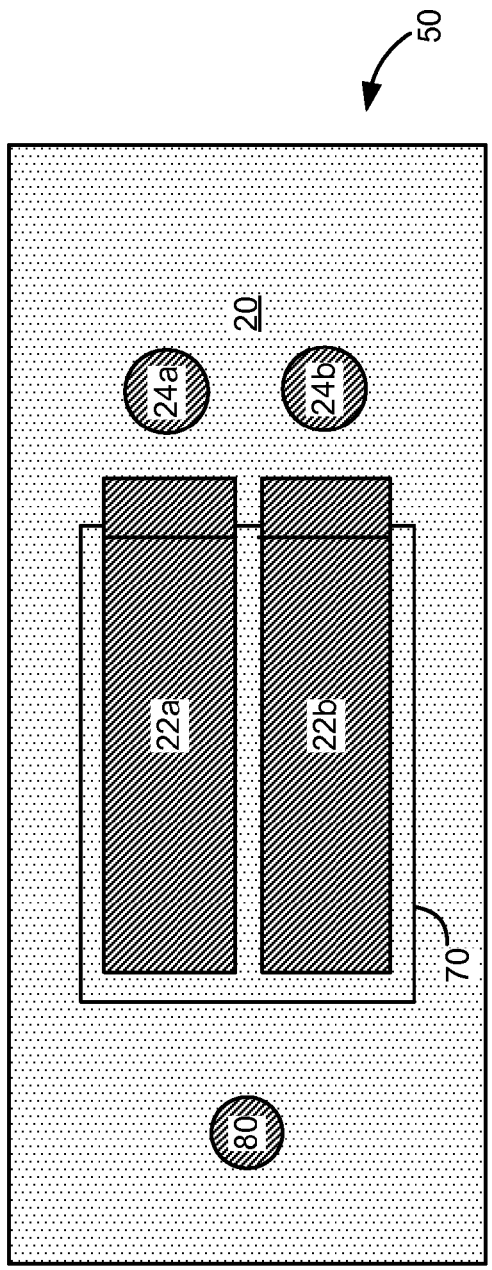
FIGS. 13A and 13B shows an alternative embodiment of the improved accelerometer or accelerator switch which comprises two bottom capacitor plates, particularly useful as a normally-open acceleration switch.
Figure 13B:
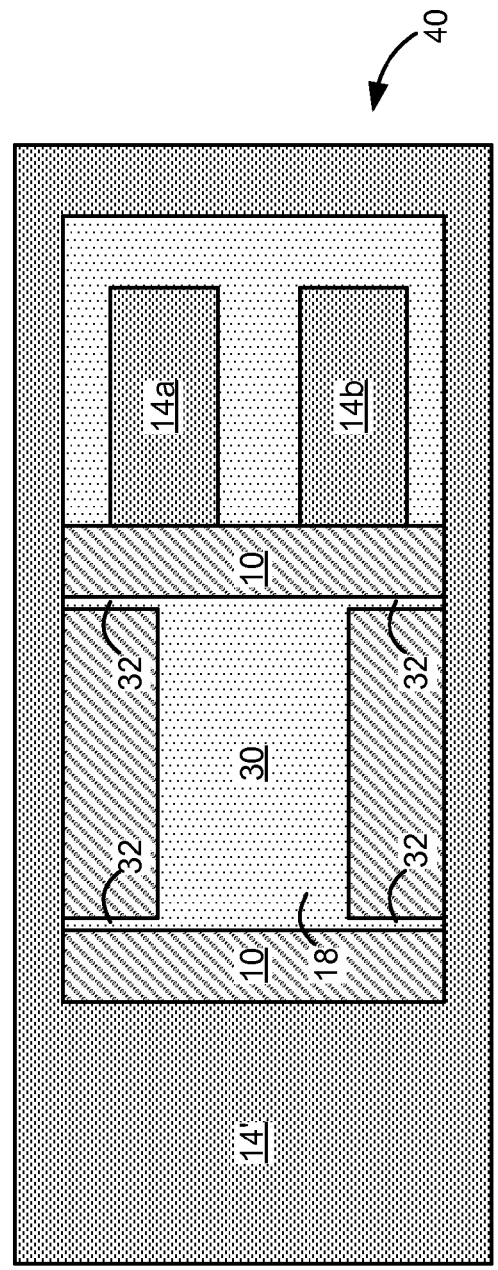
Figure 14B:
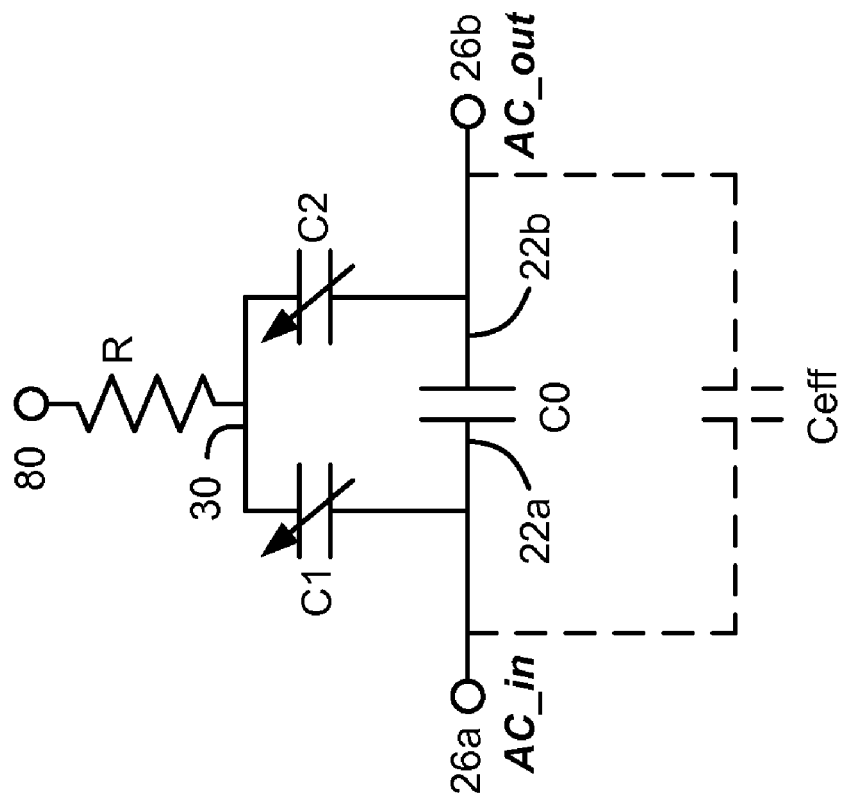
FIG. 14 shows an equivalent circuit for the embodiments of FIGS. 13 and 15.
Figure 14A:
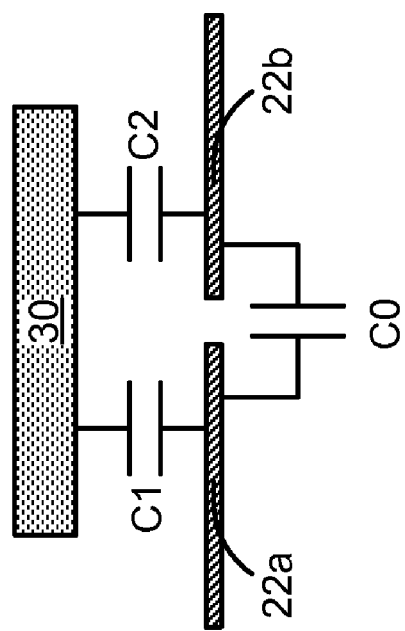

Another modification is illustrated in FIGS. 13 and 14. In this embodiment, the plate 22 has been divided into two plates 22a and 22b, and accordingly each plate 22a and 22b communicates with its own terminal via P+regions 14a and 14b through plugs 24a and 24b. (Although not shown, it should be understood that plugs 24a and 24b ultimately couple to solder bumps or other terminals 26a and 26b on the outside of the device; see FIG. 14B). The presence of a single mass 30 overlying two plates gives rise to three capacitances, which are illustrated in FIGS. 14A and 14B. FIG. 14A shows a simplified cross section of the two plates 22a, 22b and the mass 30, while FIG. 14B illustrates an effective capacitive circuit. As can be seen, two of the three capacitances, C1 and C2, are formed between the mass 30 and either of the plates 22a and 22b, and capacitance C0 is formed between the two plates themselves. Because the mass 30 is moveable, C1 and C2 are variable. C0, a function of the layout of the plates 22a and 22b, is fixed. The effective capacitance, Ceff, between the two external terminals coupled to the plates 26a, 26b) can be derived from the capacitive network: Ceff=C0+(1/C1+1/C2)$^{-1}$. As one skilled in the art will recognize from this equation, movement of the mass 30 towards both plates 22a and 22b will increase C1 and C2, which in turn will increase the effective capacitance, Ceff, between the two terminals.

In the configuration of FIG. 13, and when the device 8 is used as an acceleration switch, the fixed capacitance is made small to minimize the signal transfer from terminal 26a (AC_in) to terminal 26b (AC_out) when the mass 30 is in its rest position. As the mass 30 moves towards the plates 22a, 22b at higher accelerations, C1 and C2 are increased (such that C1 and C2>>C0), with the effect that the AC input couples through C1 and C2 in series to the switch detect circuit coupled to output terminal 26b (well known, and thus not shown). In this embodiment, the resistor R of FIG. 14B, representing the resistance of the P+ layer 14', should be large, so it does not significantly reduce the signal at 30. In short, the AC input signal at terminal 26a is sufficiently passed to the output terminal 26b only after some threshold acceleration is exceeded, and thus the device 8 realizes the function of a "normally on" accelerator switch. However, by assessing the relative magnitude of the AC signal at the output, the device 8 can also function as an accelerometer.

Figure 15:
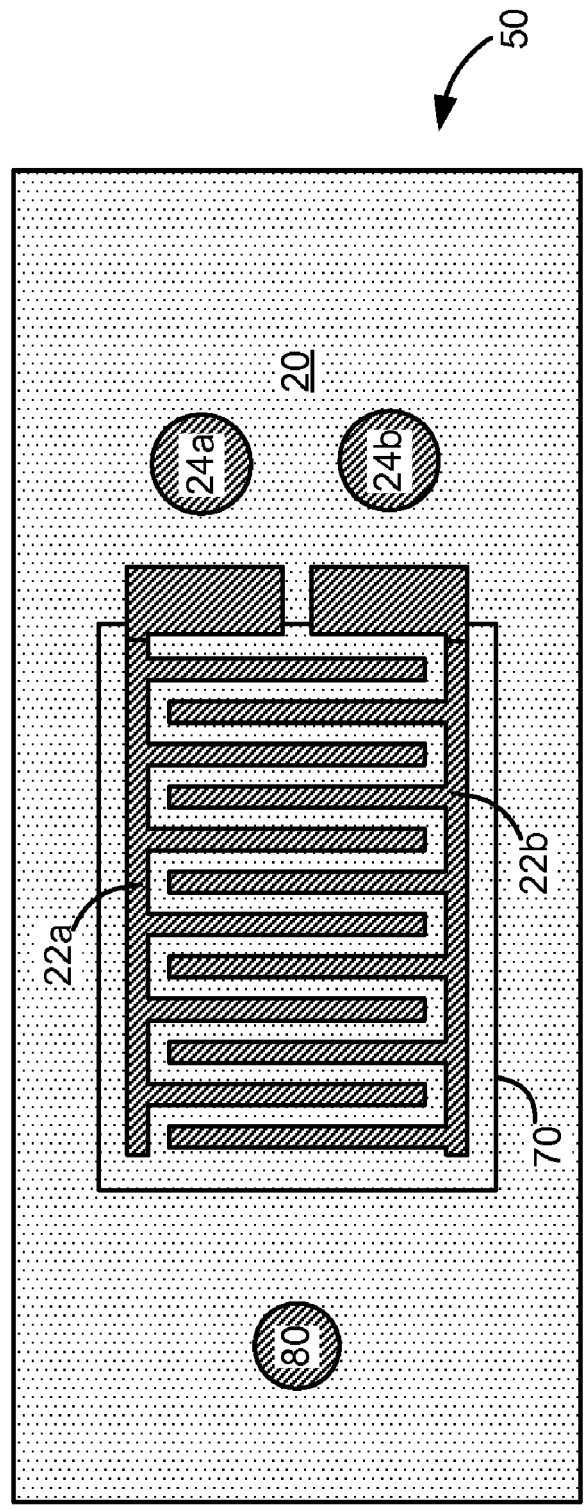
FIG. 15 shows an alternative embodiment of the improved accelerometer or accelerator switch which comprises two inter-digitized bottom capacitor plates, particularly useful as a normally-closed acceleration switch.

FIG. 15 shows yet another modification to the two-plate configuration shown in FIG. 13A. This embodiment retains the two plates 22a and 22b, but as can be seen in FIG. 15, the plates are heavily inter-digitized. This increase in area between the two plates greatly increases the fixed capacitance between them, C0 (see FIGS. 14A and 14B). In this embodiment, when C0 is large, signal transfer is maximized from AC input terminal 26a to AC output terminal 26b when the mass 30 is in its rest position. When acceleration is present, and the mass 30 moves towards the plates 22a and 22b, C1 and C2 are increased. In this embodiment, it is preferred to ground the mass 30 through terminal 80, which couples to the mass 30 through P+ layer 14'. When C1 and C2 increase, the input AC signal at terminal 26a couples to ground (terminal 80) through C1 and C2, rather than passing to the output terminal 26b. To assist in such ground coupling, it is preferred that the resistance R between terminal 80 and the mass 30 be as small as possible, which can be achieved by doping P+ layer 14' to a great extent. Moreover, it is preferred that the input AC signal at terminal 26a be supplied from a signal generator (not shown) with a high output impedance. Specifically, and referring to FIG. 14B, if the signal generator feeding 26a has a high impedance, then this higher impedance forms a first voltage divider with C1. So long as the impedance of C1 is higher at the frequency of the signal, then substantially all of the voltage appears at 22a, which is then coupled to 22b via C0. Since C2 will be similar to C1 and has a high impedance, it will not drain signal from 22b, so a signal will be present at 26b that can be substantially the same as at 26a when the mass 30 is in the rest position. When the mass 30 approaches the plates 22a and 22b, both C1 and C2 are increased. As C1 increases, it acts with the output impedance of the signal generator feeding 26a to reduce the signal at 22a. Moreover, the increase of C2 acts as a divider with C0 to even further reduce the signal that appears at 26b. In short, the result of the embodiment of the configuration of FIG. 15 is a "normally closed" acceleration switch. Again, by assessing the relative magnitude of the AC signal at the output, device 8 can also function as an accelerometer.

It is again worth mentioning that the disclosed structure and method of fabrication of the improved accelerometer or acceleration switch 8 is merely illustrative, and that modifications can be made which are still within the spirit and scope of the invention. Thus, to the extent such modifications fall within the scope of the appended claims and their equivalents, they are intended to be covered by this patent.

What is claimed is:

1. An accelerometer device or acceleration switch device, comprising:
    a moveable mass formed in a first substrate and suspended by a plurality of flexible beams, wherein the mass comprises a first plate of a capacitor and is coupled to a first external terminal; and
    a conductive plate formed in a second substrate and spaced from the mass, wherein the conductive plate comprises a second plate of the capacitor, and wherein the conductive plate is coupled to a second external terminal,
    wherein the mass is moveable orthogonally to the conductive plate in a presence of an acceleration to change a spacing between the capacitor plates, and wherein the capacitance of the capacitor is sensed at the first and second external terminals and the mass comprises a dielectric layer in the spacing between the first and second capacitor plates.

2. The device of claim 1, wherein the plurality of flexible beams comprise serpentines.

3. The device of claim 1, wherein the first and second substrates are sandwiched together.

4. The device of claim 1, wherein the first substrate comprises a Silicon-On-Insulator (SOI) substrate, and wherein the mass comprises a top crystalline silicon layer of the SOI substrate.

5. The device of claim 1, wherein the mass is formed in a heavily doped crystalline silicon layer.

6. The device of claim 1, wherein the second substrate comprises a dielectric substrate.

7. An accelerometer device or acceleration switch device, comprising:
   a moveable mass suspended by a plurality of flexible beams; and
   first and second conductive plates in a same plane and underlying the mass and spaced from the mass, wherein the first conductive plate forms a first capacitor with the mass, and wherein the second conductive plate forms a second capacitor with the mass, wherein the first plate is coupled to a first external terminal, and wherein the second plate is coupled to a second external terminal, wherein the mass moves orthogonally to the first and second conductive plates in a presence of an acceleration to change a spacing in the first and second capacitors, and wherein the capacitance is sensed at the first and second external terminals.

8. The device of claim 7, wherein the plurality of flexible beams comprise serpentines.

9. The device of claim 7, wherein the mass is fabricated on a first substrate, and wherein the first and second conductive plates are fabricated on a second substrate, and wherein the first and second substrates are sandwiched together.

10. The device of claim 9, wherein the first substrate comprises a Silicon-On-Insulator (SOI) substrate, and wherein the mass comprises a top crystalline silicon layer of the SOI substrate.

11. The device of claim 7, wherein the mass is formed in a heavily doped crystalline silicon layer.

12. The device of claim 7, wherein the mass comprises a dielectric layer in the spacing between the first and second capacitor plates.

13. The device of claim 7, wherein the mass is coupled to a fixed potential at a third terminal.

14. The device of claim 7, wherein the first and second plates are inter-digitized.

15. A method of forming an accelerometer device or acceleration switch device, comprising:
   suspending a mass in a first substrate by a plurality of flexible beams, wherein the mass is formed in a conductive layer of the first substrate, wherein the mass further comprises a dielectric layer;
   forming at least one conductive plate in a second substrate, wherein the dielectric layer faces the at least one conductive plate; and
   sandwiching the first and second substrates together to form the device, wherein the mass is moveable orthogonally to the at least one conductive plate in a presence of an acceleration to change the spacing between the at least one conductive plate and the conductive layer, the device including a first external terminal and a second external terminal, wherein the capacitance is sensed at the first and second external terminals.

16. The method of claim 15, wherein the first and second substrates are sandwiched together using anodic bonding.

17. The method of claim 15, wherein the mass is suspended in the first substrate by undercutting the conductive layer.

18. The method of claim 15, wherein the second substrate comprises a dielectric substrate, and wherein at least first and second external terminals are formed in the second substrate.

* * * * *